(12) United States Patent
Dezeustre et al.

(10) Patent No.: US 9,151,225 B2
(45) Date of Patent: Oct. 6, 2015

(54) AIR INTAKE STRUCTURE FOR TURBOJET ENGINE NACELLE

(71) Applicant: AIRCELLE, Gonfreville L'Orcher (FR)

(72) Inventors: Nicolas Dezeustre, Le Havre (FR); Pierre Caruel, Le Havre (FR); Patrick Gonidec, Bretx (FR); Patrick Boileau, Tournefeuille (FR)

(73) Assignee: AIRCELLE, Gonfreville L'Orcher (FR)

( * ) Notice: Subject to any disclaimer, the term of this patent is extended or adjusted under 35 U.S.C. 154(b) by 0 days.

(21) Appl. No.: 14/304,555

(22) Filed: Jun. 13, 2014

(65) Prior Publication Data
US 2014/0291066 A1 Oct. 2, 2014

Related U.S. Application Data

(63) Continuation of application No. PCT/FR2012/052836, filed on Dec. 7, 2012.

(30) Foreign Application Priority Data

Dec. 15, 2011 (FR) ...................................... 11 61658

(51) Int. Cl.
*F02C 7/045* (2006.01)
*B64D 33/02* (2006.01)

(52) U.S. Cl.
CPC ................ *F02C 7/045* (2013.01); *B64D 33/02* (2013.01); *B64D 2033/0206* (2013.01); *B64D 2033/0286* (2013.01)

(58) Field of Classification Search
CPC .................................. F02C 7/045; F02K 1/82
USPC ......................................................... 181/214
See application file for complete search history.

(56) References Cited

U.S. PATENT DOCUMENTS

| 4,749,150 | A * | 6/1988 | Rose et al. ................... 244/53 B |
| 5,743,488 | A * | 4/1998 | Rolston et al. .............. 244/53 B |
| 5,934,611 | A * | 8/1999 | Tindell et al. ............... 244/53 B |
| 6,772,857 | B2 * | 8/2004 | Porte et al. .................... 181/210 |
| 7,967,108 | B2 * | 6/2011 | Harper .......................... 181/292 |
| 8,066,096 | B1 * | 11/2011 | Francisco et al. ............. 181/214 |
| 2006/0237260 | A1 * | 10/2006 | Costa et al. ................... 181/210 |
| 2010/0108435 | A1 * | 5/2010 | Valleroy et al. ............... 181/214 |
| 2012/0241249 | A1 * | 9/2012 | Porte et al. .................... 181/214 |

* cited by examiner

Primary Examiner — Forrest M Phillips
(74) Attorney, Agent, or Firm — Brinks Gilson & Lione

(57) ABSTRACT

An air intake structure for a turbojet engine nacelle includes a substantially annular main structure having an internal wall, an external wall and an air intake lip structure connecting the external and internal walls upstream. The air intake structure also includes a first acoustic attenuation structure which has a holed acoustic skin, a cellular core and a solid rear skin with which the internal wall is equipped, and a second acoustic attenuation structure having a similar architecture fitted to a part of the air intake lip substantially near a junction with the internal wall. The rear skin of the first acoustic attenuation structure is aligned with the rear skin of the second acoustic attenuation structure, both of rear skins being structural.

9 Claims, 2 Drawing Sheets

Figure 3:
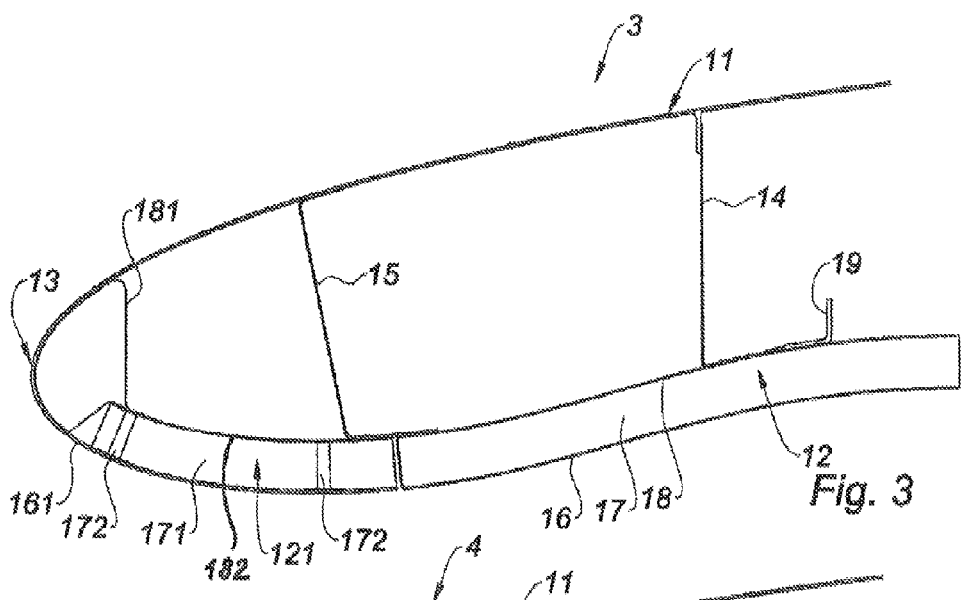

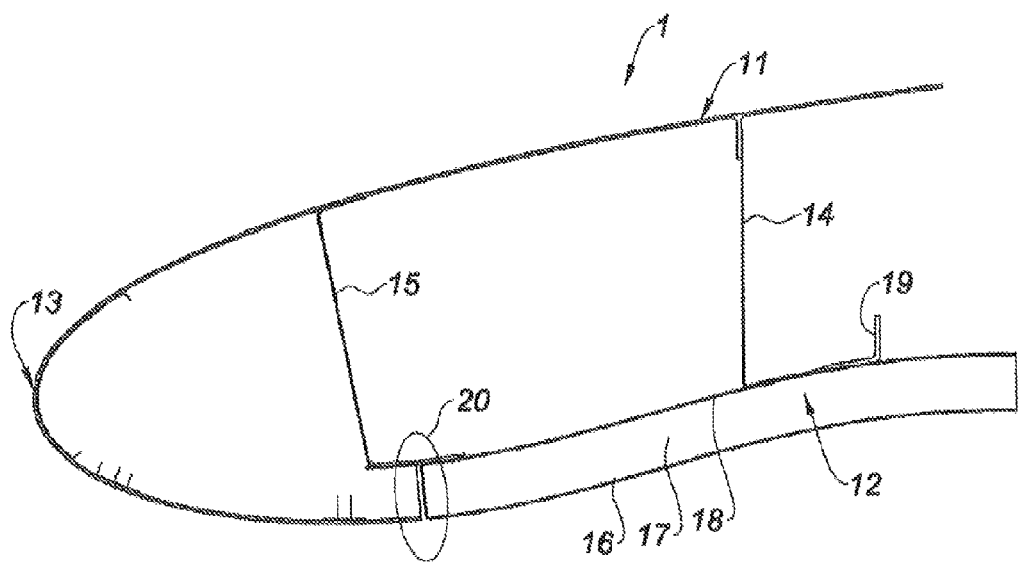
Fig. 1 *Prior Art*
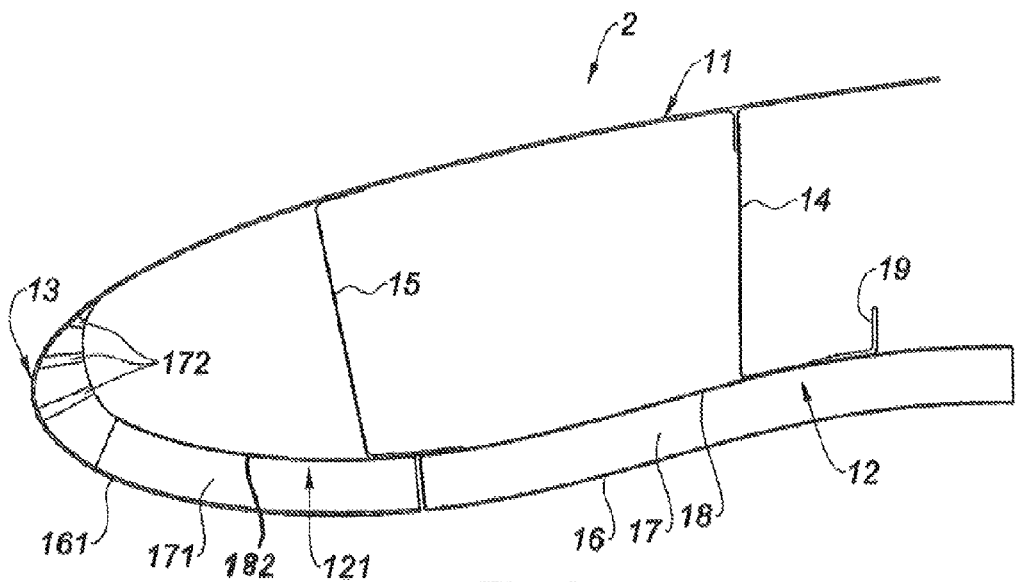
*Fig. 2*

AIR INTAKE STRUCTURE FOR TURBOJET ENGINE NACELLE

CROSS-REFERENCE TO RELATED APPLICATIONS

This application is a continuation of International Application No. PCT/FR2012/052836, filed on Dec. 7, 2012, which claims the benefit of FR 11/61658, filed on Dec. 15, 2011. The disclosures of the above applications are incorporated herein by reference.

FIELD

The present disclosure relates to an air intake structure for a turbojet engine nacelle.

BACKGROUND

The statements in this section merely provide background information related to the present disclosure and may not constitute prior art.

An aircraft propulsion unit comprises conventionally a turbojet engine housed inside a nacelle.

The nacelle generally has an annular structure comprising an air inlet upstream of the turbojet engine, a median section intended to surround a fan of said turbojet engine and its casing, and a downstream section intended to surround the combustion chamber of the turbojet engine and enclosing thrust reversal means where necessary. It can be ended with an ejection nozzle, the outlet of which is situated downstream of the turbojet engine.

The air intake structure is used to optimize the capture of air required for the supply of the fan of the turbojet engine and to channel it toward this fan.

An air intake structure comprises, particularly upstream, a leading edge structure commonly called air intake "lip".

The air intake lip ensures capture of the air and is fastened to the rest of the air intake structure that ensures the channeling of the air captured toward the turbojet engine.

To this end, the rest of the air intake structure has a substantially annular structure comprising an external panel ensuring the external aerodynamic continuity of the nacelle and an internal panel ensuring the internal aerodynamic continuity of the nacelle, in particular with the fan casing at the median section. The air intake lip ensures the upstream junction between these two walls and can be particularly integrated with the external panel. It also ensures de-icing or anti-icing of the nacelle, by applying heat to melt and evaporate ice that may deposit therein.

All of the air intake structure is fastened upstream of the median section of the nacelle (external panel) and of the fan casing (internal panel). The absorption of forces transiting through the air intake is particularly ensured by a fastening flange to the fan casing.

The internal surface of the air intake structure is exposed to a significant air flow and is situated near the fan blades. It is therefore situated in a significant noise zone.

In order to remedy this situation insofar as possible and in order to reduce the noise pollution generated by the turbojet engine, the internal panel of the air intake section is equipped with an acoustic attenuation structure.

This acoustic attenuation structure is in the form of a sandwich panel with a cellular core having a holed external skin, called acoustic skin, intended to be exposed to noise, and a solid internal skin. The cellular core thus constitutes a resonator adapted to trap sound waves.

As for the air intake lip it is not equipped with an acoustic attenuation structure for structural and thermal reasons, and it is therefore necessary to provide connections at the junction between the internal panel and the air intake lip. Due to the thickness of the acoustic attenuation structure, this connection presents many implementation difficulties.

There are several possibilities to ensure the transition between the internal panel equipped with the acoustic attenuation structure and the air intake lip.

First of all, it is possible to provide connections at the acoustic skin between the internal panel and the air intake lip.

There are also solutions with solid and acoustic operational skins but calculations of force paths and of dimensioning are more complex.

In the conventional solutions, the air intake lip is made from a non-acoustic skin (solid) and the internal panel has a solid skin (also called "backskin" or rear skin) of its acoustic panel, which is structural. The connection is made by means of a structural crank ensuring mechanical connection and the transmission of the forces between said back skin and the air intake lip despite the offset due to the thickness of the acoustic panel. Because of these geometric constraints, the crank is structurally difficult to achieve and thus impacting the mass of the unit. Moreover, it prevents the extension of the acoustic panel and the extension of its performances to the structure of the air intake lip.

There is therefore a need to improve the structural strength of such an air intake structure and to allow the use of at least part of the air intake lip zone in order to improve the acoustic performances by providing it with an acoustic attenuation structure extending the one of the internal wall.

SUMMARY

The present disclosure relates to an air intake structure for a turbojet engine nacelle comprising a substantially annular main structure having an internal wall and an external wall and an air intake lip structure connecting said external and internal walls upstream, a first acoustic attenuation structure having a holed acoustic skin, a cellular core and a solid rear skin with which said internal panel is equipped, and a second acoustic attenuation structure having a similar architecture fitted to part of the air intake lip substantially near a junction with the internal wall, characterized in that the rear skin of the first acoustic structure is aligned with that of the second acoustic structure, said rear skin also being structural.

Therefore, by providing that the rear skin is aligned between the two acoustic attenuation structures, the force passages are greatly facilitated and it provides the structural strength for all of the acoustic attenuation structures of the internal wall and the air intake. The holed acoustic skin corresponding to each of these structures can be non-structural, and it is no longer necessary to provide a connection crank.

It follows therefrom a gain in mass as well as an overall simplified structure and the possibility to have an acoustic attenuation structure extending over the maximum of the available exposed surface.

In addition, by the acoustic skins not being structural, they can be very thin and have a reduced thickness of a few tenths of a millimeter, while a structural skin providing mechanical properties must have sufficient thickness, typically in the order of the millimeter.

Whereas previously, the presence of the crank resulting in a loss of acoustic absorption properties over a length of about 5 cm over the entire circumference of the air inlet, the solution according to the present disclosure allows an edge-to-edge junction of the acoustic structures resulting in a minimal loss in the acoustic zone only of about ten millimeters in the case of a non-structural bonding between the structures.

In one form, the rear skin of the first acoustic structure is common to the second acoustic structure, said rear skin also being structural.

Advantageously, the air intake lip is integrated into the external wall.

In another form, the second acoustic structure is extended along the air intake wall at a leading edge zone with sharp curvature of the air intake lip.

Advantageously, the zone of the leading edge, the thickness of the second acoustic structure decreases progressively.

More advantageously, the second acoustic attenuation structure decreases until the solid rear skin meets an external wall of the air intake structure.

In the leading edge zone, the cellular core of the second acoustic structure may be maintained by way of honeycomb studs.

According to another form, in the leading edge zone, the second acoustic structure has a discontinuous cellular core made from several sections, each one having an appropriate curvature.

In still another form, the air intake structure comprises at least one structural gusset associated to the rear skin of the second acoustic structure.

The present disclosure also relates to a turbojet engine nacelle, characterized in that it comprises an air intake structure according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a longitudinal cross-section schematic representation of an air intake structure according to the prior art; and FIGS. 2 to 5 are longitudinal cross-section schematic representations of alternative forms of the air input structures according to the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As represented in FIG. 1, an air intake structure 1 according to the prior art has a substantially annular structure comprising an external wall 11, intended to provide the external aerodynamic continuity with the rest of the nacelle downstream (not represented) and an internal wall 12 intended to provide the internal aerodynamic continuity of the nacelle with a fan casing.

The external wall 11 and the internal wall 12 are connected upstream with an air intake lip 13 wall forming a leading edge of the nacelle.

The interior holding of the various walls 11, 12, 13 is done using partitions. There is, in particular, a downstream partition 14 substantially near a connection with the fan casing and an upstream partition 15 substantially situated at the junctions between the wall of the air intake lip 13 and the internal 12 and external 11 walls. The number of partitions, two in this form of the present disclosure, is in no way restrictive. The interior holding of the walls can be achieved using any number of partitions, and even without any partition.

The internal wall 12 is fitted to an acoustic attenuation structure comprising an external acoustic skin 16, holed and oriented toward the outside of the structure so as to be exposed to the air flow, a cellular core 17 forming a resonator, and a rear skin 18, or "backskin", which is solid (not perforated).

The air intake lip wall 13 is not fitted to an acoustic attenuation structure and is simply made from a solid skin.

According to this form of the prior art, the rear skin 18 of the acoustic attenuation structure is structural and operational. In particular, it allows the transfer and absorption of forces toward the fan casing via a connection flange 19.

The force absorption from the wall of the air intake lip can be done via the acoustic skin 16, thus made structural and operational, or via a crank reorienting the force path toward the rear skin 18. In any case, there is a zone 20 forming a structural node resulting in an acoustic surface loss.

FIGS. 2 to 5 show different forms of the air intake structures 2 to 5 according to the present disclosure.

The air intake structure 2 according to the present disclosure provides the air intake lip which is fitted to an acoustic attenuation structure 121 having a holed acoustic skin 161 and a cellular core 171.

In accordance with the present disclosure, the acoustic attenuation structure 121 also has a solid and structural rear skin 182 aligned with the rear skin 18 of the first acoustic attenuation structure and therefore providing the transfer of forces between the air intake lip and the internal wall 12.

As represented in FIG. 2, the second acoustic attenuation structure 121 extends along the air intake wall 13 at the leading edge zone having a sharp curvature.

In such a sharp curvature zone, it is difficult to correspondingly shape a single cellular core.

Also, it is possible to achieve the cellular core 171 into several discontinuous segments, each one having an appropriate curvature. The different segments may be implanted by means of fixing studs 172 of the honeycomb.

More specifically, we will notice that in the leading edge zone of the air intake lip 13, the thickness of the acoustic attenuation structure 121 gradually decreases until the rear skin 182 meets the wall 13.

Figure 4:
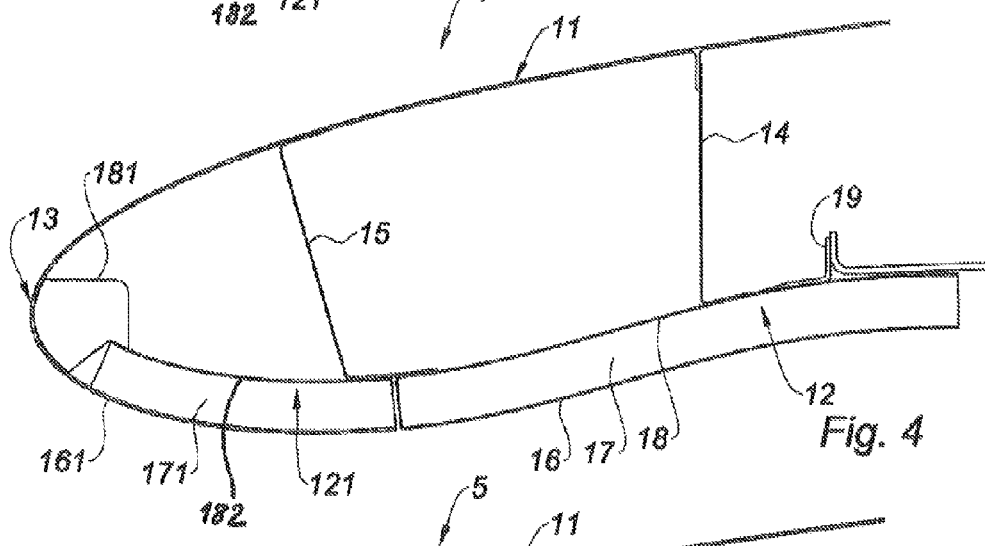

FIGS. 3 and 4 show air intake structures 3, 4 in which the acoustic attenuation structure 121 of the air intake lip is maintained by means of a gusset 181.

Figure 5:
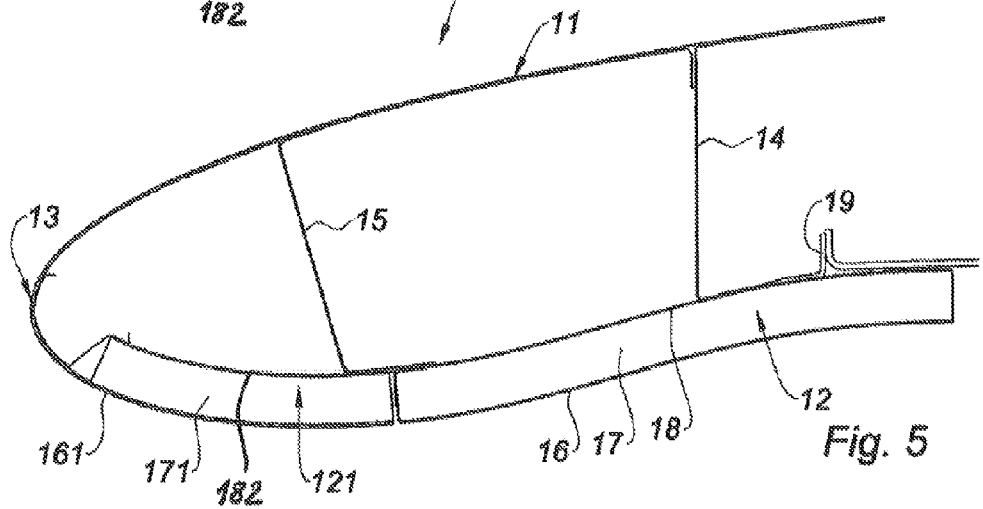

If the cellular structure allows it, and as represented in FIG. 5, part of the forces can be absorbed and transferred to the rear skin 182 by shearing through the cellular core 171.

Although the present disclosure has been described by a particular example of form, it is evident that it is in no way limited and that it comprises all the technical equivalents of the described means as well as their combinations if they enter the scope of the present disclosure.

What is claimed is:

1. An air intake structure for a turbojet engine nacelle comprising:
   a substantially annular main structure which comprises an internal wall, an external wall and an air intake lip wall connecting said external and internal walls upstream;

a first acoustic attenuation structure comprising a holed acoustic skin, a cellular core and a non-perforated rear skin with which said internal wall is equipped; and a second acoustic attenuation structure comprising an architecture fitted to a part of the air intake lip wall substantially near a junction with the internal wall, wherein the non-perforated rear skin of the first acoustic attenuation structure is aligned with a non-perforated rear skin of the second acoustic attenuation structure, the non-perforated rear skins being structural so as to transfer forces between the air intake lip wall and the internal wall.

2. The air intake structure according to in claim 1, wherein the air intake lip wall is integrated into the external wall.

3. The air intake structure according to claim 1, wherein the second acoustic attenuation structure extends along the air intake lip wall at a leading edge zone with a sharp curvature of the air intake lip wall.

4. The air intake structure according to claim 3, wherein in the leading edge zone, a thickness of the second acoustic attenuation structure progressively decreases.

5. The air intake structure according to claim 4, wherein the thickness of the second acoustic attenuation structure decreases until the non-perforated rear skin of the second acoustic attenuation structure meets the external wall of the air intake structure.

6. The air intake structure according to claim 3, wherein in the leading edge zone, the cellular core of the second acoustic attenuation structure is maintained by means of honeycomb studs.

7. The air intake structure according to claim 3, wherein in the leading edge zone, the second acoustic attenuation structure has a discontinuous cellular core made from several sections, each having an appropriate curvature.

8. The air intake structure according to claim 1, further comprising at least one structural gusset associated to the non-perforated rear skin of the second acoustic attenuation structure.

9. A turbojet engine nacelle comprises the air intake structure according to claim 1.

* * * * *